No. 714,842. Patented Dec. 2, 1902.
R. F. WENTZ.
ART OF MANUFACTURING CEMENT.
(Application filed Apr. 13, 1900.)
(No Model.) 2 Sheets—Sheet 1.
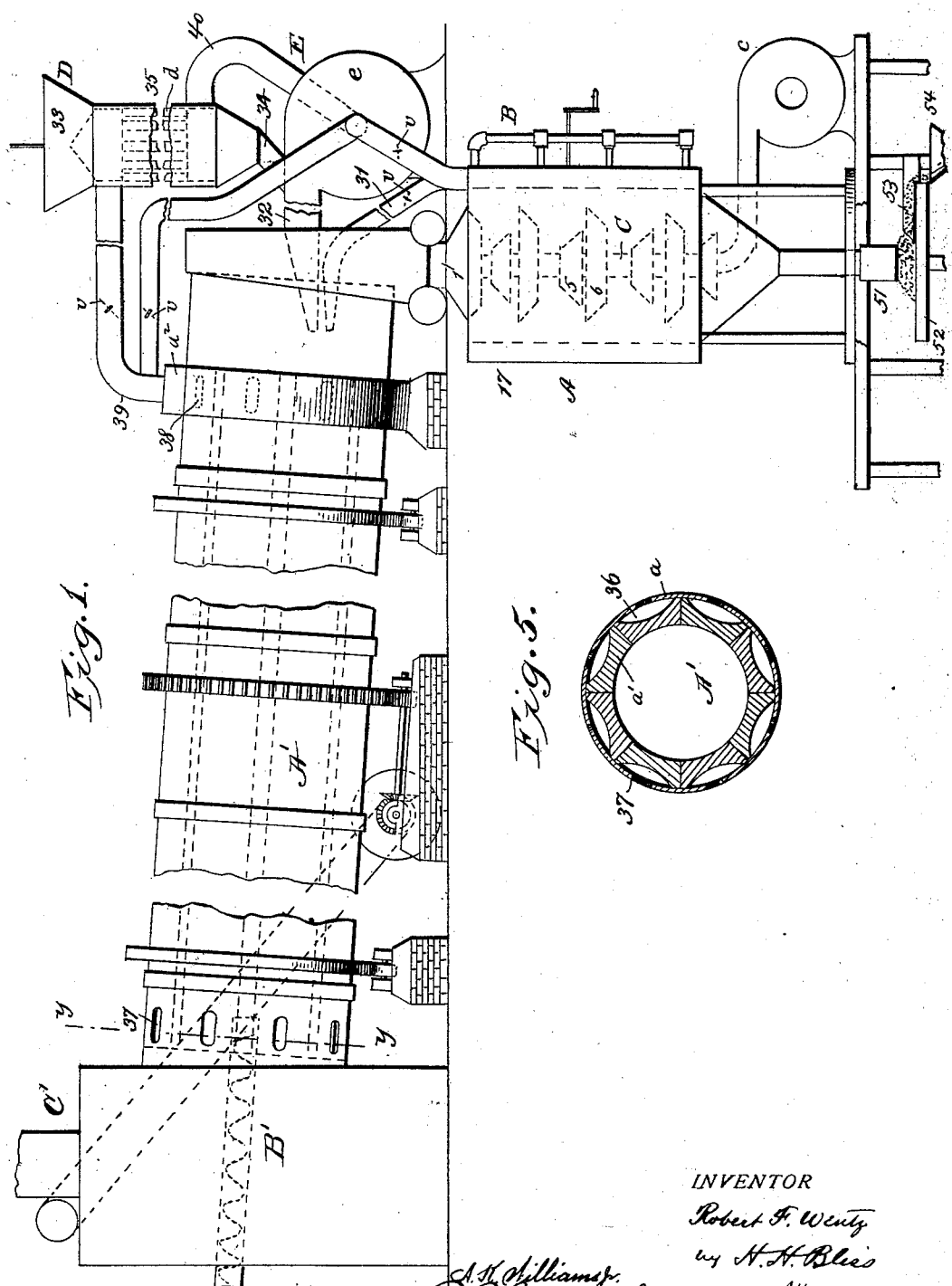
INVENTOR
Robert F. Wentz
by H. H. Bliss
Attorney
Witnesses:

No. 714,842. Patented Dec. 2, 1902.
R. F. WENTZ.
ART OF MANUFACTURING CEMENT.
(Application filed Apr. 13, 1900.)
(No Model.) 2 Sheets—Sheet 2.
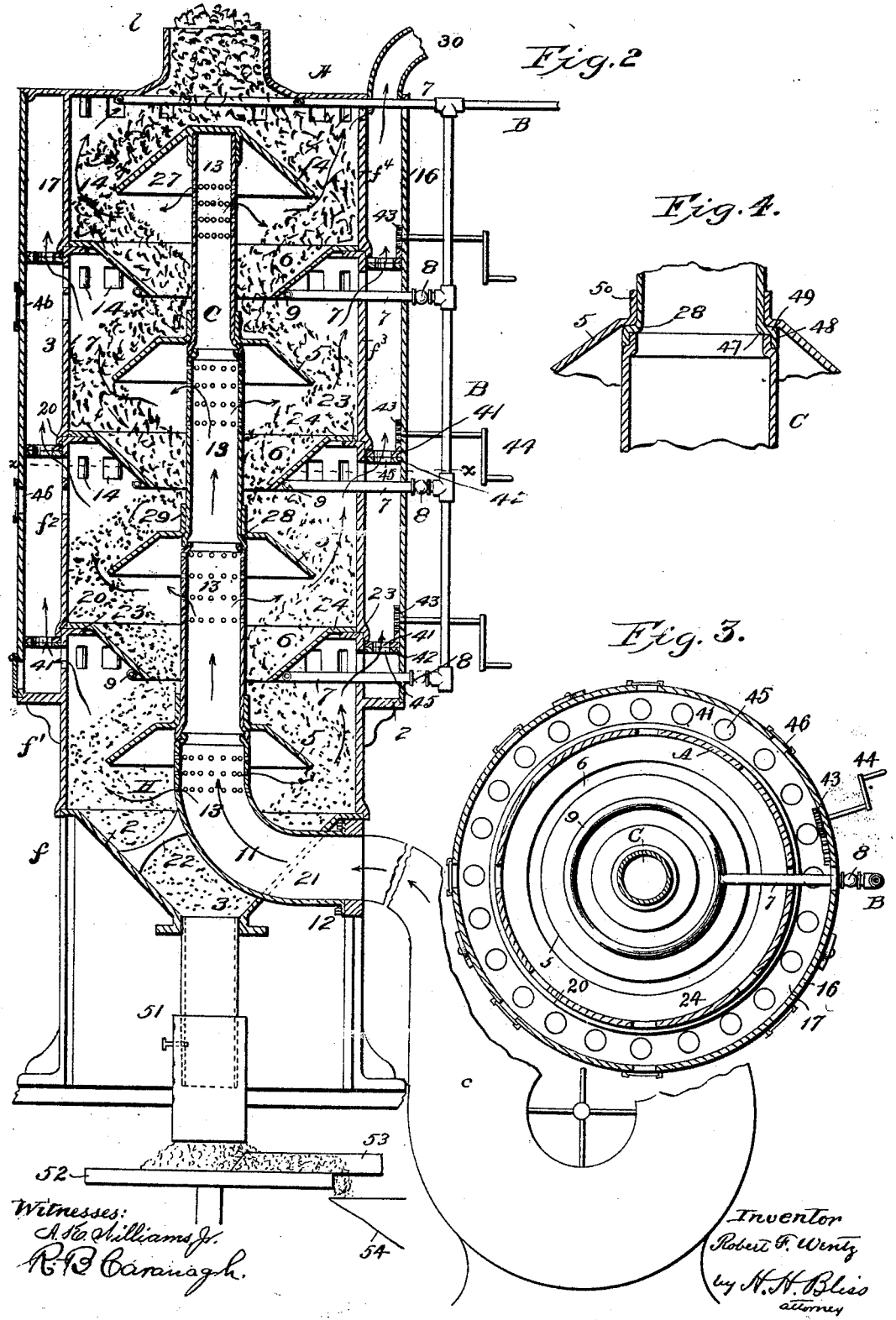

UNITED STATES PATENT OFFICE.

ROBERT F. WENTZ, OF NAZARETH, PENNSYLVANIA.

ART OF MANUFACTURING CEMENT.

SPECIFICATION forming part of Letters Patent No. 714,842, dated December 2, 1902.

Application filed April 13, 1900. Serial No. 12,753. (No specimens.)

*To all whom it may concern:*

Be it known that I, ROBERT F. WENTZ, a citizen of the United States, residing at Nazareth, in the county of Northampton and State of Pennsylvania, have invented certain new and useful Improvements in the Art of Manufacturing Cement, of which the following is a specification, reference being had therein to the accompanying drawings.

This invention relates to improvements in the art of manufacturing cement.

It pertains, among other things, to the generation of the excessive heat in the region in the kiln where the ore or composition is calcined, and I have succeeded in attaining a heat much greater than that produced by any of the mechanisms or processes heretofore used within my knowledge, and I attain it without increase in consumption of fuel. That which is generally done in this respect in the cement manufacture as now practiced consists in supplying to the interior of the kiln a stream or spray of carbon in a finely-reduced condition by means of an air-blast, which advances it to and into the kiln. It has been proposed to employ in lieu of the finely-divided solid carbon jets or sprays of carbon oil, and it has also been suggested to use streams of dry hydrocarbon gas or producer-gas; but the expense incident to the employment of either of the latter two materials is so great as to prohibit their use in the manufacture of cement, and therefore in practice to-day carbon in a solid form is commonly employed; but the solid carbon is disadvantageous because of the difficulty in obtaining economically perfect combustion therewith. If the carbon is cold and the oxygen-supplying air is cold, large quantities of the fuel material past through without avail. The utmost that has been attempted has been to pass the air in an uncertain and ineffective manner through an inclined cylinder or drum, along the bottom of which the clinker from the kiln is moved, and conduct this imperfectly-heated air to the end of the kiln, but without means for delivering it under pressure and with precision to the points requiring it.

One of the purposes of my invention is to provide a mode of treatment (which will be fully explained hereinbelow) by which solid carbon can be used with much greater efficiency and economy than have been attainable heretofore in cases where coal has been used as a fuel.

The invention also relates to an improved method of treating the heated and calcined cement clinker to rapidly cool and disintegrate it and remove therefrom foreign bodies of an undesirable nature and quickly prepare it for grinding and packing.

Inasmuch as a full understanding of the improvements in the art and the improved mode of treatment can be best attained from the consideration of one of the numerous forms of apparatus by which they can be carried out, I have illustrated in the drawings one such mechanism which I select as a type for the purpose of illustration; but it will be understood that many of the steps of treatment can be followed with other devices.

Figure 1 is a side elevation of a cement-kiln illustrated more or less conventionally and showing also an apparatus by which the materials for producing combustion are supplied and those by which the calcined cement is treated. Fig. 2 is a vertical section of one form of that part of the apparatus which is used for treating the calcined clinker. Fig. 3 is a cross-section on the line $x$ $x$ of Fig. 2. Fig. 4 is a vertical section of part of the air-conduit on a larger scale. Fig. 5 is a section of the kiln on line $y$ $y$, Fig. 1.

In the drawings I have shown a cement-kiln of the rotary sort, it being indicated as inclined somewhat to the horizontal and mounted upon supporting and driving rolls in the well-known manner. It is also illustrated as having a feeding apparatus (indicated generally and conventionally at B') and as having its receiving end arranged to communicate with an exhaust chimney and stack at C'.

D indicates the receptacle or initial conduit for the carbon portion of the fuel ingredients, and E represents the means for projecting the carbon body into the cement-kiln A'.

It will be understood that the apparatus so far referred to is used in such way as that a stream of the ingredients for forming the cement is delivered through the feeding mechanism B' and advanced through the cylindrical kiln A', the latter being under constant rotation, and that at the same time the combustion-causing materials are introduced at the opposite or lower end of the kiln, the currents of the burning gases and the products of combustion being forcibly impelled in one direction toward the stack, while the cement ingredients and the calcined clinker formed therefrom are being advanced in the opposite direction.

The parts are so arranged and the combustion materials are so related that the chamber within the kiln may be considered as composed of two or more comparatively well-defined regions. That near the delivery end of the kiln and extending for a number of feet backward from said end is the region where the most intense heat is produced, this being the region to which are delivered initially the combustion materials. Beyond that is the region where the heat is somewhat less intense and wherein the products of combustion come into contact with the newly-introduced composition, which is thereby completely dried and heated preliminarily to the final calcining, vitrifying, or analogous results. For the sake of convenience I herein refer to the composition orignally introduced into the kiln as the "ore" and the product of the treatment in the kiln as the "clinker;" but it will be understood that I do not thereby mean to indicate any specific character of the materials either prior or subsequent to the calcining. That which I refer to as "ore" for convenience is sometimes the native composition of rock material as obtained from the quarries or mines, sometimes is formed entirely artificially by the compounding of the several ingredients prior to introducing to the kiln, and sometimes is partly a native compound and partly artificial, the attempt being made in well-conducted manufacture to maintain, as is well known, certain relative proportions of the ingredients, and when the natural composition is found to vary with respect to the proportions desired the ingredients which are low in their relative proportions are increased artificially, and I desire it to be understood that the improved method and apparatus which I herein present are applicable for use in any of these instances.

The intensely-high heat which is requisite for the production of the cement proper from the initial materials is the cause of a great waste in heat when the methods heretofore employed are followed, and, moreover, the carbon parts of the fuel have been so largely relied upon that there has been an unnecessarily large relative quantity thereof consumed to produce the heat. The rotary kilns, such as herein indicated, have numerous advantages incident to them which imperatively demand their employment, and yet there are also incident to them serious disadvantages, particularly this, that they are so constructed and operated that it is impossible to convey the materials through them in a solid mass extending continuously across the interior chamber; but, on the other hand, there is necessarily an unobstructed duct large in cross-section, through which can readily move and escape the carbon and other combustion materials and gases prior to their complete combustion, and can also escape the gaseous products of such complete combustion as may occur, though the latter is relatively much lower than it should be for economy. In other words, the employment of the rotary cement-kiln in turn requires important steps to be taken in order to prevent its well-known advantages from being largely compensated by the disadvantages arising from imperfect combustion and from the rapid and easy escape of the products of combustion (perfect and imperfect) before imparting their heat to the cement materials in the kiln.

It is well known that certain relative proportions of carbon and the other combustion materials must be maintained in order to have perfect combustion and get the benefit of the high heat resulting and also that if the carbon can be supplemented by hydrogen in proper proportions and that if the requisite amount of oxygen be delivered a more intense heat can be attained.

I supply to the heating region in the kiln a hydrogen-supplying body in conjunction with the carbon. At present I prefer to supply it by delivering a stream of aqueous steam or of the gases resulting from the decomposition of a highly-heated water or steam. An apparatus for supplying this is shown in the drawings.

A indicates a vertical tubular chamber through which the clinker is caused to pass by gravity, the material being fed in at the top of said chamber through the opening 1. At the lower end of the chamber A the material in a cooled condition is received in a hopper 2, from which it passes by an opening 3 into a pile for subsequent delivery and treatment or into any convenient form of delivery-chute or conveyer.

Within the chamber A are arranged and suitably supported centrally of the chamber a series of deflectors 4 5 5 5. The upper deflector 4 acts initially upon the material as it enters through the opening or pipe 1 to spread its lumps or particles outward, and the deflectors 5, which are arranged one after the other in line below the part 4, act similarly and successively upon the material to agitate it and repeatedly throw it outward in the chamber A and to somewhat retard its passage through the chamber. Between the several pairs of deflectors and within the chamber are arranged hopper-shaped plates 6, suitably supported, as from the walls of the chamber, which act successively to receive the material as it is thrown out by the deflector next above and direct it back toward the center of the chamber, causing it to fall upon the upper or inner part of the deflector next below. These hopper-plates also serve to retard the downward passage of the material and in conjunction with the deflectors serve to agitate the material and roll its lumps or materials over and over, so that their surfaces are fully exposed to the actions of the water and air currents.

B is a main water-pipe connected with any suitable source of supply and provided with branches 7, controlled by valves 8. Said branches extend within the chamber A and connect with suitably-perforated spraying-rings 9 or equivalent devices arranged at proper places in the chamber A one below the other and adapted to deliver water to the clinker as it passes over or by the deflectors and hopper-plates. In order to protect the spraying devices from the descending material, I arrange the circular pipes 9 just below the hopper-plates 6 and without the lower edges of the latter, in which position also the perforated pipes are best adapted to spray and thoroughly wet the lumps of the material as they are spread out upon and roll over the faces of the deflectors. By proper manipulation of the several valves 8 the desired amount in the aggregate of water may be delivered to the material, and that proportion of the amount may be delivered in each part of the chamber A, according to temperature of the material, which will best effect the cooling and produce the desired ultimate effect on the condition of such material.

An air pipe or conduit is shown at C, having its main portion arranged centrally of the chamber A and extending from near the bottom to near the top of the same. The lower part of the pipe C terminates in a bend or elbow 11, preferably bolted to the lower part or section of said chamber, as indicated at 12, and through this bend air may be forced or delivered by and from any suitable pipe connection and apparatus c. The air-pipe is provided at suitable points with perforations 13, through which the air is delivered into the chamber A, and in order that the air may have the most thorough and effective action in carrying away the vapor of the water and the heat from the material I arrange the openings 13 in several series, one series or collection of perforations for each deflector and just below the latter or on a level with the space between the deflector and hopper-plate next below.

The steam that is generated from the water which is sprayed upon or brought into contact with the highly-heated clinker and the air which is forced through the mass or masses of the latter are taken into the duct or chamber 17, (through the apertures 14,) formed by the casing 16 around the upper part of the device. From this chamber or duct 17 they are taken through the duct or pipe 30 and from there are delivered to the heating region in the interior of the kiln. As shown, they are taken from the pipe 30 through the duct 31 and delivered at points adjacent to those where the carbon is delivered by the fuel-duct, they (the steam and air from the mechanism at A) being carried into the kiln independently of the streams of fuel and air taken from the devices at D; but in some cases and whenever preferred they may be taken directly from the chamber 17 to the forcing apparatus at E and be thereby commingled with the carbon parts of the fuel and projected therewith into the heating region.

As shown, the forcing mechanism E consists of a pressure-fan e, communicating with the interior of the kiln through the duct 32.

The fuel-supplying mechanism at D is shown as consisting of a hopper or vertically-arranged receptacle 33, adapted to carry a sufficient volume of reduced or pulverized carbon. The latter passes downward from the receptacle or holder through a duct 34, which delivers it to the feeding-duct 32. The air that is forced forward by the fan or pressure mechanism at E picks up and carries forward the pulverized carbon, the relative quantity of the latter being capable of control.

One of the serious omissions in cement-manufacturing mechanism as heretofore constructed has been the lack of any means for raising the temperature of the carbon prior to admitting it to the interior of the kiln. If is in introduced cold or at a temperature relatively low compared with that in the flame or heating region of the kiln, large quantities of the carbon are, because of the light and pulverulent character thereof, carried through the heating region before undergoing perfect combustion, and therefore such combustion is not attained.

I provide means for raising the carbon to a high temperature prior to its introduction to the flame region. This can be done either by taking some or all of the gaseous or vaporous bodies drawn from the chamber 17 into the duct 32 either directly or through the forcing mechanism at E. While passing through this fuel-duct, the particles of the carbon are brought into intimate contact with the heated currents of gas or vapor and are raised to a high temperature before reaching the interior of the kiln, and consequently they are ready for instantaneous conversion into the gases of combustion and a perfect burning results. In some cases and when handling some materials I prefer to carry this preliminary heating of the carbon to a still greater extent. For this purpose I subject the carbon in mass relatively—that is, prior to forming streams or jets of the pulverized or reduced coal—to the action of heated bodies directly applied. This can be done in the way illustrated, for example—that is to say, by causing the carbon to pass through or around the reduced ducts, as shown at 35, it in this instance passing through the reduced spaces between a series or nest of tubes d, the latter serving as ducts for currents of heated air or equivalent obtained from any suitable source. The carbon in such case can be heated to any desired degree. Preferably the heat is carried up to the point just short of where the coal would tend to soften or liquefy. If coal of the proper character be employed, the lighter carbon gases can be driven off; but inasmuch as it is desired that it should retain its pulverulent condition the heat should not be carried beyond such degree as permits the carbon to pass in powdered form into the feed-duct 32. The heated air for accomplishing this can be taken from the chamber 17, as above described, though I prefer to obtain it as follows: The kiln A' is constructed with an external metallic cylinder or sheathing $a$ and with an interior lining or jacketing of fire-brick or refractory material $a'$, as illustrated in Fig. 5. The lining is capable of withstanding the intensely-high heat to which the cement is subjected and is to some extent non-conducting; but although preventing the loss of some it nevertheless permits a large quantity of the heat to be abstracted and radiated, and thereby lost. I obviate the latter by interposing between the inner surface of the lining and the external surface of the kiln-drum air-chambers and causing currents of air to pass through them. These are shown at 36, being indicated as chambers or channels formed in the external surfaces of the fire-bricks and extending as nearly as possible from end to end of the kiln. At 37 their receiving ends communicate with the external atmosphere. At 38 they communicate with a chamber or casing $a^2$, which surrounds the kiln, and with the latter there is connected a duct 39.

Instead of the construction just above described others can be employed by which the heat from the interior of the kiln can be saved and utilized—as, for instance, by inclosing the kiln in a stationary casing or housing or shell, into and from which the air can be drawn.

The duct 39 can deliver the air at either of several points, as directly to the fuel-feed duct 32, the air-forcing mechanism at E, &c; but I prefer to employ this air or the requisite proportion thereof for the direct heating of the carbon in mass, as above described. The duct 39 communicates with those at 35 in coal-receptacle D, and the air after passing through these is taken by the duct 40 to the fan or forcing device E.

By means of suitable dampers or valves $v$ the heated air can be directed in whichever direction and in whatever proportions may be desired.

When the carbon is preliminarily heated in the way described and when the aqueous steam is commingled therewith and properly delivered at the points of ignition, the combustion is intensified. The solid carbon and the aqueous vapor produce a combustion material of great efficiency, the gases of the water being disassociated and a species of hydrocarbon gas being formed, which in turn violently oxidizes, enhancing the combustion resulting from the carbon alone.

I do not wish to be understood as limiting the invention to the production of well-defined hydrocarbon gas of the water-gas or kindred species, although my improved process and apparatus can be employed in such way as to effect such production, the degree of heat being attained which is requisite and if the materials are supplied in proper proportions. Many of the important ends of the invention can be reached if the preliminary heating of the carbon, considered in its solid form entirely, be properly effected and if the supplemental currents of air be raised to the proper high temperature. So, too, the supplying of hydrogen-carrying bodies—to wit, aqueous steam or vapor—is not dependent for all of its advantages upon the production of a carbon vapor or gas prior to the instant of combustion, and I believe myself to be the first to have directed into the interior of a cement-kiln a stream of steam and carbon and to have so related and proportioned them as to have the steam markedly assist the carbon in attaining perfect combustion.

Returning now to the parts at A B C, &c., it will be noticed that they were considered above as heating and steam-generating devices, whereby the heat was saved and re-utilized in promoting intense combustion at later moments in the region where the said heat was primarily produced; but it is now to be noticed that these same devices at A B C, &c., can from the standpoint of consideration of the clinker be regarded as a cooling, disintegrating, agitating, and final treating mechanism for the cement—that is to say, I accomplish two purposes or two sets of purposes by this mechanism, both of great importance. While I provide water-delivering devices adapted to supply it at different elevations in this clinker-cooling apparatus, I also provide for considerable variation in the manner of introducing it according to the circumstances and the purposes to be attained from time to time. If steam is to be violently and copiously generated, (with a corresponding cooling of the clinker,) the water is applied at the upper spraying devices, it there coming into immediate contact with the clinker while still intensely heated. In fact, the mechanism can be so operated as that the gases of composition of the water can be disassociated at points close to the upper end of the receiver A and immediately adjacent to the points of discharge from the kiln; but the secondary action of the water when brought into contact with the heated clinker is effected not only at the highest elevation, but at either of several lower ones, this action being the disintegration of the clinker lumps. The clinker leaves the kiln in lumps or agglomerated masses of uncertain sizes, varying from relatively small particles to masses of ten or twelve inches in diameter, although the ore or initially-delivered composition was thoroughly pulverized, the lump forming resulting from the vitrifying and calcining action of the heat. These lumps leave the kiln at a temperature of from 2,000° to 3,000° Fahrenheit and will retain this high heat for a long period under natural circumstances; but as economy in manufacture, purified cement, and my method of sustaining combustion in the kiln all demand that the heat should be withdrawn rapidly from these lumps I break them up quickly into smaller and smaller particles by means of the jets of water. In the upper regions of the receptacle A the heat is so intense that substantially the only results from the application of the water to the clinker is the instantaneous fracture of the lumps from contraction and expansion and the instantaneous generation of the steam, as above described; but at lower points, after the clinker has become cooled, the action of the water is to not only still further disintegrate the masses, but is to purify the cement by hydrating the foreign bodies, such as the excess of lime, and rendering them innocuous, and in cases where the water is copiously supplied they can even be washed or dissolved away. At the same time the jets of air under pressure are constantly in operation to withdraw from the cement by evaporation the surplus of water, and the several steps can be so conducted and the material so delivered and regulated that although these several purposes can be accomplished nevertheless the cement shall be delivered at the bottom of the cooling apparatus in a dry and more or less completely-reduced condition ready for the final grinding or reduction to its commercial condition.

In the event that it is not desirable to take the air or vapor from the cooling-chamber upward through the chamber 17 and duct 30, but is preferred to conduct it to the open atmosphere, such air and vapor from any part of the chamber can be cut off from the duct to the kiln by means of dampers 41, which are fitted upon damper-plates 42 and can be moved by any suitable devices, as racks and pinions 43, operated by hand devices at 44, the passage-ways at 45 being in this way opened and closed, as desired. When any one of the dampers is closed, communication with the outer air is provided by means of the doors at 46.

The chamber A is, as shown, formed of a series of separable sections $f$ $f'$ $f^2$ $f^3$ $f^4$, of cast-iron, adapted to be superposed one upon the other and fitted together and held in line by means of flanges 20, and it will be seen that as the intermediate sections are counterparts of each other a mechanism of any required length or height can be constructed by employing the proper number of similar sections. The lower section $f$ is preferably cast with the hopper-bottom 2 with an aperture 21 for the air-pipe C. At 23 there are inwardly-extending flanges to receive the flanges 24 of the deflectors 6. The upper section $f^4$ is formed with a top or closing wall and with the mouthpiece at 1.

While the air-pipe C may obviously be made in a single piece reduced in diameter at intervals, I prefer to construct it of separable sections, as illustrated in Figs. 2 and 4, so that it may be built up to the desired height, corresponding with the number of casing-sections $f'$ $f^2$, &c., employed. The lower ends of the pipe-sections are formed with shoulders 47, which rest on the tops of the sections next below, and with flanges 48, which inclose said tops, Fig. 4. These flanges form shoulders 49, on which rest the deflectors 5, and the latter are centered by sleeves 50, which fit around the air-pipe sections above the shoulders 49. The outwardly-acting deflectors are thus carried entirely by the air-pipe.

In providing for the exit or removal of the cooled and partially-disintegrated clinker from the cooler A, I prefer to employ means which maintains practically a closure of the chamber at the bottom.

51 is a chute or duct formed of two or more relatively telescoping sections. As illustrated, the upper section is attached to the hopper-bottom 2 and the lower section is vertically adjustable on the upper.

52 is a revolving table, in proximity to the top of which the lower end of the duct 51 is adjusted to allow of the gradual escape of the clinker as the table revolves at a rate determined by the space between the duct and the table and the speed of revolution of the latter.

53 is a stationary scraper held above and along a portion of the surface of the table in such manner that it will arrest the clinker carried around by the table and cause it to be fed off into a receiving hopper or chute 54, from which the clinker is taken to the mill or for other desired treatment.

The above being the preferred construction of the apparatus and the operations of its various parts, the operation as a whole is as follows: The ore, composition, or clinker-producing material enters the kiln A', where it is subjected to an elevated temperature in the presence of a body of gaseous or pulverized carbon, carbon and hydrogen (from aqueous steam) being supplied by the supplying devices at D, the cooling devices A B C, and the forcing mechanism at E, and the combustion-causing materials being burned in the kiln in the presence of the ore. The products of combustion pass through the kiln to the stack C', where they pass off principally in the form of carbon dioxid and aqueous vapor. The ore, gradually taking the form of clinker, passes on through the kiln, (which in the meantime is rotated,) finally passing through the region of greatest heat and finding its exit to the cooling and vapor-producing apparatus A B C. The waste radiant heat of the kiln has in the meantime highly heated the air in the spaces 36, and such heated air has heated the pulverized carbon in the supplying device D and finally has passed (or such proportion of it as is needed for oxidizing) through the forcing apparatus E with the carbon into the kiln. The cooling and partial disintegrating of the clinker by the devices at A B C has produced a hydrogen-supplying body of aqueous vapor, which passes with the carbon into the presence of the ore in the kiln. The production of the high degree of heat necessary for the calcining of the ore is thus effected in a very simple manner with a minimum of solid fuel and is most economically applied to the ore with very little waste, while the necessary operation of cooling the clinker and partly disintegrating it or preparing it for disintegration is caused to furnish a considerable part of the calcining heat of the kiln both by conservation and by the production of combustion-causing vapors or gases. The economies of heat, labor, and time realized both by the process and by the apparatus are very great.

I do not herein claim any of the novel matters incident to the special form of mechanism which I have shown, having on May 21, 1900, filed an application therefor and preferring herein to claim the novel features incident to the method or art of treating the material herein described irrespective of any particular devices for carrying the same into effect.

I am aware that heretofore it has been proposed to feed carbon or coal in a finally subdivided or comminuted state for combustion in various classes of furnaces; but I believe myself to be the first to combine a pulverized carbon fuel with the gaseous products arising from the disintegration of the highly-heated clinker under the influence of air and water. I also believe myself to be the first to preliminarily heat pulverized carbon fuel for the production of the calcining-blast by the highly-heated gaseous products from the disintegration of the calcined material.

What I claim is—

1. The herein-described improvement in the art of treating cement ore, it consisting in subjecting the cement ore to a calcining operation by the combustion of pulverized carbon and the gaseous products from hot cement clinker when treated with water in liquid form and air, substantially as set forth.

2. The herein-described improvement in the art of treating cement ore, it consisting in heating a pulverized fuel and mixing therewith the gaseous products arising from the disintegration of highly-heated cement clinker when treated with water and air, and causing the calcination of said ore by the combustion of said mixture, substantially as set forth.

3. The herein-described method for the treatment of cement-producing material, consisting in passing the material through a heating region and forming clinker therefrom, causing said clinker to pass in an upwardly and downwardly extending column by gravity and deflecting its course, supplying aqueous bodies and air to said clinker while so passing and conducting gaseous products from said clinker to said heating region.

4. The herein-described method for the treatment of cement-producing material, consisting in passing the material through a heating region and forming cement clinker therefrom, causing said clinker to pass in a body or column from the said heating region, supplying aqueous bodies and air direct to the most highly heated parts of said clinker nearest the said heating region, and conducting gaseous products from said clinker to said heating region.

5. The herein-described improvement in the art of treating cement-producing material which consists in calcining the material by the combustion of a suitable fuel, and supplying to the combustion region gaseous products arising from the application of water in liquid form to highly-heated clinker.

6. The herein-described improvement in the art of treating cement-producing material which consists in calcining the material by the combustion of a suitable fuel, and supplying to the combustion region gaseous products arising from the application of water in liquid form and air to highly-heated clinker.

7. In the manufacture of cement the herein-described method which consists in applying, to highly-heated cement clinker, aqueous bodies and air for the disintegration and cooling of the clinker, producing a blast composed of the gaseous products arising from said clinker in a calcining region and supplying a pulverized fuel to said blast.

8. In the manufacture of cement the herein-described method which consists in heating a pulverized fuel by the heated gaseous products arising from the disintegration of hot cement clinker under the application of water and air, injecting said gaseous products and fuel into a calcining region and causing the combustion of the same for the production of said clinker.

9. In the manufacture of cement, the herein-described method for the production of gases adapted to promote combustion, which consists in applying water and air to the most highly heated portion of cement clinker, and collecting the gaseous products therefrom separate from the products arising from the less-heated portion of the clinker.

10. In the manufacture of cement the herein-described method which consists in applying water and air to the more highly heated portion of cement clinker, collecting the gaseous products therefrom separate from the gaseous products arising from the less-heated portion of the clinker, and causing the combustion of the first-mentioned products with a fuel for calcining and the production of said clinker.

11. In the manufacture of cement the herein-described method which consists in producing a highly-heated cement clinker, applying thereto water and air and disintegrating and cooling the clinker, collecting the gaseous products arising from the most highly heated portion of the clinker and from said water separate from the gaseous products arising from the less highly heated portion of the clinker, and causing the combustion of the first-mentioned gaseous products for the calcining and the production of said clinker.

12. In the manufacture of cement, the herein-described method which consists in producing a highly-heated cement clinker, causing the same to pass in a continuously-moving body or column, applying water and air to said body, and withdrawing the gaseous products of said application laterally from said body whereby the gaseous products from the most highly heated portions of the clinker may be separated from the gaseous products from the cooler portions of the clinker.

13. In the manufacture of cement, the herein-described method for the production of gases adapted to promote combustion, which consists in supplying aqueous bodies and air to highly-heated cement clinker, collecting the gaseous products therefrom, supplying aqueous bodies and air to less-heated cement clinker and causing a mixture of the aqueous products, in regulated amount, from the less-heated clinker, with said gaseous products.

14. The herein-described method of treating cement ore, it consisting in passing it through a heating region supplied with carbon in a solid and relatively finely divided form, together with streams or jets of a gaseous or vaporous body supplying oxygen, and streams or jets of a gaseous or vaporous body supplying hydrogen, substantially as set forth.

15. The herein-described improvement in the art of treating cement-producing material, consisting in subjecting the said material to a calcining operation in a highly-heated region, conducting the clinker from said region in a body, subjecting that portion of said body which is nearer said region, and is most highly heated to the direct action of water, and air, and conducting the gaseous products from said treatment to said region, substantially as set forth.

16. The herein-described process in the art of manufacturing cement, which consists in passing cement ore through a heating region to produce a clinker, treating the clinker while in a highly-heated state with water in liquid form, forcing air through the mass of clinker while being so treated, collecting the aqueous and gaseous vapors produced by such treatment, and conducting such vapors into the presence of the cement ore in the heating region.

17. The herein-described method of treating cement ore and clinker, it consisting in passing the ore through a heating region, forming cement clinker therewith, supplying carbon to the said heating region, supplying water in liquid form directly to the clinker after it has passed from the heating region, and conducting the steam from said water and delivering it to the heating region simultaneously with the delivery of the said carbon, substantially as set forth.

18. The herein-described method of treating cement ore and clinker, consisting in heating the ore by the combustion of suitable material and forming cement clinker, supplying water in liquid form directly to the clinker after it has passed from the place of heating, conducting the steam from said water and delivering it to the combustion causing and heating, material, substantially as set forth.

19. The herein-described method of treating cement ore and clinker, consisting in passing the ore through a heating region and forming cement clinker, supplying combustible material to the said heating region, supplying water in liquid form to the clinker after it has passed from the heating region, conducting the steam from said water and clinker, and delivering it to the heating region with said combustible material, substantially as set forth.

20. The herein-described method of treating cement ore and clinker, it consisting in passing the ore through a heating region, forming cement clinker therewith, supplying carbon and streams of atmospheric air to the said heating region, supplying water in liquid form to the clinker after it has passed from the heating region, and forming aqueous steam from said water, conducting the said steam from the said clinker and delivering it to the heating region, simultaneously with the delivery of the said atmospheric air and carbon, substantially as set forth.

21. The herein-described method of treating cement ore and clinker, it consisting in passing the ore through a heating region, forming cement clinker therefrom, supplying carbon to the said heating region, heating the said carbon preliminary to supplying it to the said heating region, supplying an oxygen-yielding gas to the said heating region, and supplying streams or jets of hydrogen-yielding gas or vapor to the said heating region, substantially as set forth.

22. The herein-described method of treating cement ore and clinker, it consisting in passing the ore through a heating region and forming clinker therefrom, supplying solid finely-divided carbon to the said heating region, passing bodies of air under pressure through the clinker after it has left the heating region and conducting the said air while under pressure to the said heating region, substantially as set forth.

23. The herein-described method of treating cement ore and clinker, it consisting in passing the ore through a heating region and forming clinker therefrom, supplying carbon to the said heating region, forming a vertically-arranged mass of the said clinker supplying water thereto, delivering air under pressure to and forcing it through the said vertically-arranged mass of clinker, and delivering the said air under pressure from the mass of clinker to the heating region, substantially as set forth.

24. The herein-described method of treating cement ore and clinker, it consisting in passing the ore through a heating region, and forming cement clinker therefrom, supplying carbon to the said heating region, delivering said clinker from the heating region to an air-duct, supplying water to the hot clinker, agitating the clinker while in the said duct, supplying currents of air under pressure to the said duct, causing said currents to pass through the clinker mass, withdrawing the said air and conducting it under pressure to said heating region, substantially as set forth.

25. The herein-described method of treating cement clinker, it consisting in applying water in liquid form thereto while the clinker is in a heated condition and simultaneously passing currents of atmospheric air through the said clinker while the latter is collected in a mass across the path of the air, substantially as set forth.

In testimony whereof I affix my signature in presence of two witnesses.

ROBERT F. WENTZ.

Witnesses:
N. CURTIS LAMMOND,
E. C. DUFFY.